United States Patent
Battlogg

(10) Patent No.: US 12,292,757 B2
(45) Date of Patent: May 6, 2025

(54) MAGNETORHEOLOGICAL BRAKING DEVICE

(71) Applicant: INVENTUS Engineering GmbH, St. Anton i.M. (AT)

(72) Inventor: Stefan Battlogg, St. Anton i.M. (AT)

(73) Assignee: INVENTUS Engineering GmbH, St. Anton i.M. (AT)

( * ) Notice: Subject to any disclaimer, the term of this patent is extended or adjusted under 35 U.S.C. 154(b) by 407 days.

(21) Appl. No.: 17/786,703

(22) PCT Filed: Dec. 18, 2020

(86) PCT No.: PCT/EP2020/087267
§ 371 (c)(1),
(2) Date: Jun. 17, 2022

(87) PCT Pub. No.: WO2021/123343
PCT Pub. Date: Jun. 24, 2021

(65) Prior Publication Data
US 2023/0029016 A1 Jan. 26, 2023

(30) Foreign Application Priority Data

Dec. 18, 2019 (DE) .................. 10 2019 135 029.8
Dec. 23, 2019 (DE) .................. 10 2019 135 760.8

(51) Int. Cl.
*G05G 5/03* (2008.04)
*F16D 57/00* (2006.01)
(Continued)

(52) U.S. Cl.
CPC ............. *G05G 5/03* (2013.01); *F16D 57/002* (2013.01); *G05G 1/10* (2013.01); *G06F 3/016* (2013.01);
(Continued)

(58) Field of Classification Search
CPC .................. F16F 9/535; F16D 57/002; F16D 2200/0034; G05G 1/08; G05G 1/10;
(Continued)

(56) References Cited

U.S. PATENT DOCUMENTS 8,193,670 B2  6/2012 Liao et al.
10,386,929 B2  8/2019 Eck et al.
(Continued)

FOREIGN PATENT DOCUMENTS

CN   102349218 A   2/2012
CN   103807329 A   5/2014
(Continued)

*Primary Examiner* — Robert A. Siconolfi
*Assistant Examiner* — San M Aung
(74) *Attorney, Agent, or Firm* — Laurence A. Greenberg; Werner H. Stemer; Ralph E. Locher

(57) ABSTRACT

A magnetorheological braking device with a fixed holder and a first and second braking component. One of the braking components is connected to the holder and does not rotate relative thereto. The two braking components are continuously rotatable relative to one another. The first braking component extends axially, and the second braking component has a hollow shell part extending around the first braking component. A peripheral gap, filled with a magnetorheological medium, is formed between the first and second braking component. The first braking component has an electric coil and a magnetically conductive core extending axially. Magnetic field concentrators, on the core and/or the shell part, protrude into the gap, creating variable gap height. The electric coil is wound around a section of the core. A magnetic field of the electric coil runs through the core, magnetic field concentrators, and the gap into a wall of the shell part.

29 Claims, 5 Drawing Sheets

(51) Int. Cl.
*G05G 1/10* (2006.01)
*G06F 3/01* (2006.01)
*G06F 3/0338* (2013.01)
*G06F 3/0354* (2013.01)
*G06F 3/0362* (2013.01)

(52) U.S. Cl.
CPC . *F16D 2200/0034* (2013.01); *G05G 2505/00* (2013.01); *G06F 3/0338* (2013.01); *G06F 3/03543* (2013.01); *G06F 3/0362* (2013.01)

(58) Field of Classification Search
CPC ...... G05G 5/03; G05G 2505/00; G06F 3/016; G06F 3/0338; G06F 3/0362; G06F 3/03543
USPC ..................................................... 188/267.2
See application file for complete search history.

(56) References Cited

U.S. PATENT DOCUMENTS

| | | | |
|---|---|---|---|
| 10,976,827 B2 | 4/2021 | Battlogg | |
| 11,266,867 B2 | 3/2022 | Battlogg | |
| 11,300,990 B2 | 4/2022 | Battlogg | |
| 2002/0057152 A1* | 5/2002 | Elferich | B60K 35/10 335/220 |
| 2010/0231069 A1* | 9/2010 | Liao | H02K 1/02 188/267.2 |
| 2011/0128135 A1 | 6/2011 | Periquet et al. | |
| 2011/0181405 A1 | 7/2011 | Periquet et al. | |
| 2012/0085613 A1 | 4/2012 | Böse et al. | |
| 2012/0211315 A1 | 8/2012 | Shiao et al. | |
| 2015/0136548 A1 | 5/2015 | Shimura et al. | |
| 2015/0144442 A1* | 5/2015 | Shimura | F16D 63/002 188/267.2 |
| 2016/0378131 A1 | 12/2016 | Battlogg | |
| 2018/0073590 A1* | 3/2018 | Battlogg | G05G 5/04 |
| 2018/0320750 A1 | 11/2018 | Takahashi et al. | |
| 2019/0111300 A1* | 4/2019 | Battlogg | B01D 69/14 |
| 2020/0355229 A1 | 11/2020 | Battlogg | |

FOREIGN PATENT DOCUMENTS

| | | |
|---|---|---|
| CN | 104963986 A | 10/2015 |
| CN | 107111368 A | 8/2017 |
| CN | 107710106 A | 2/2018 |
| CN | 107735748 A | 2/2018 |
| CN | 108930731 A | 12/2018 |
| CN | 109073030 A | 12/2018 |
| DE | 112004002908 B4 | 6/2010 |
| DE | 102015104927 A1 | 10/2016 |
| DE | 102018100390 A1 | 7/2019 |
| EP | 1168622 A2 | 1/2002 |
| WO | 2012034697 A1 | 3/2012 |
| WO | 2017001696 A1 | 1/2017 |

* cited by examiner

MAGNETORHEOLOGICAL BRAKING DEVICE

FIELD AND BACKGROUND OF THE INVENTION

The present invention relates to a magnetorheological braking device having a stationary mount and having at least two brake components and/or damper components. The magnetorheological braking device according to the invention can be used for braking mutual relative movements in many technical fields. The magnetorheological braking device according to the invention can also be used as a haptic operating device and be used, for example, for operating technical devices in vehicles, (as a rotary actuator; a rotate/push actuator; for infotainment systems, air conditioning systems, transmission gear selectors, for navigation systems, for seat adjustments, in the steering system or in the steering wheel, for the adjustment of vehicle suspension systems, for the adjustment of driving modes, etc.) motor vehicles, aerospace and aircraft systems, ships, boats, agricultural machinery (tractors, combine harvesters, harvesters, other agricultural machinery), construction machinery and material handling machinery (forklift trucks, etc.), or in medical or industrial systems. The invention can also be used for the operation, or as an input device, of/for washing machines, kitchen/domestic appliances and devices, radios, still and movie cameras, HiFi and TV systems, smart devices, smart domestic devices, laptops, personal computers, smart watches, in a crown gear of wristwatches or as a computer mouse or as a rotating wheel in a computer mouse or in controllers, game consoles, gaming equipment, as a rotary button in a keyboard, or other devices.

Magnetorheological fluids have minute ferromagnetic particles such as, for example, carbonyl iron powder, distributed in an oil, for example. Spherical particles having a production-related diameter of 1 to 10 μm are used in magnetorheological liquids, wherein the size and shape of the particles is not uniform. When such a magnetorheological fluid is impinged by a magnetic field, the carbonyl iron particles of the magnetorheological fluid form a chain along the magnetic field lines so that the rheological properties of the magnetorheological fluid (MRF) are significantly influenced as a function of the shape and intensity of the magnetic field.

WO 2012/034697 A1 discloses a magnetorheological transmission apparatus which has two couplable components, the intensity of the coupling of the latter being able to be influenced. A duct having a magnetorheological medium is provided for influencing the coupling intensity. The magnetorheological medium in the duct is influenced by a magnetic field. Rotating members on which acute regions that contain the magnetorheological medium are provided in the duct. The duct, or at least a part thereof, is able to be impinged with the magnetic field of a magnetic field generator device so as to selectively interlink the particles, and to wedge them to the rotating member, or release said particles. This magnetorheological transmission apparatus can also be used on a rotary button for operating technical equipment. Such a magnetorheological transmission apparatus functions and permits the transmission of comparatively great forces or moments while at the same time having a relatively small construction mode and power requirement.

Disclosed in WO 2012/034697 A1 is also a rotary button or operating button in which the actual button is attached so as to be rotatable about a shaft. The braking moment can be controlled by the magnetic field of an electric coil. Should a higher generatable braking moment be desired, cylindrical rollers instead of spherical rotating members can also be used so that the magnetic field acts on a longer distance, or larger area. It has been demonstrated, in particular in the case of rotary or operating buttons having a relatively small diameter, that an increase in the length of the rolling members does not necessarily lead to an increase in the maximum generatable braking moment. It has been demonstrated that the cause thereof lies in that the magnetic field is closed by the central shaft, or has to pass through the latter. The small diameter of the shaft restricts the generatable braking moment, because the magnetic field required for the braking action is rapidly saturated in the (shaft) material. The material passed through by the magnetic field does not permit any higher magnetic flux, which is why a more intense magnetic field cannot make its way to the rollers. The smallest cross section passed through by the magnetic field in the entire magnetic circuit defines the maximum possible magnetic flux and thus the maximum braking moment in the brake apparatus. The use of longer rollers as rotating members in this instance can even have a negative effect on the generatable braking moment because the magnetic field is distributed across the longer roller area. A lower field strength bears on the said roller area. As the achievable braking effect is not a linear function of the magnetic field but this disproportionally increases in the case of more intense magnetic fields, the achievable braking effect accordingly drops disproportionally in the case of weaker magnetic fields.

SUMMARY OF THE INVENTION

It is therefore the object of the present invention to provide a magnetorheological braking device, which permits a high braking moment (torque), or a higher braking moment (torque) than is the case in the prior art in particular also in the case of small or even very small diameters.

This object is achieved by a magnetorheological braking device having the features of the claims. Preferred refinements of the invention are the subject matter of the dependent claims. Further advantages and features of the magnetorheological braking device are derived from the general description and the description of the exemplary embodiments.

A magnetorheological braking device according to the invention has a stationary mount and at least two brake components. One of the two brake components is connected in a rotationally fixed manner to the mount, and the two brake components are continuously rotatable relative to one another. A first brake component extends in an axial direction. The second brake component comprises a casing part which is rotatable about the first brake component and is configured to be hollow. An encircling gap which is at least partially and in particular completely filled with a magnetorheological medium is configured between the first brake component and the second brake component. The magnetorheological medium here wets the brake components. The first brake component comprises (at least) one electric coil and a core which is made from a magnetically conductive material and extends in the axial direction. The core comprises a main body. Magnetic field concentrators configured on the core and/or magnetic field concentrators configured on the casing part protrude into the gap such that an encircling gap having a gap height which is variable (across the circumferential angle) results. The electric coil is wound about at least one portion of the core such that a magnetic field of the electric coil runs through the core and the magnetic field concentrators and through the gap (extending axially and/or radially) into a wall of the casing part.

The magnetic field concentrators preferably extend across the external circumference of the core by way of at least one angular segment.

The first brake component defines an axial direction. However, the first brake component, at least locally, can also be configured so as to be angled in relation to the axial direction. The wording pertaining to the core of the first brake component extending in the axial direction in the context of the present invention is understood to mean that the core extends at least also substantially in the axial direction. The core can have a profile which has a slight angle in relation to the axial direction. For example, the core can also be aligned at an angle of 2.5° or 5° or 10° or 15° in relation to the axial direction. Likewise, the winding of the electric coil does not have to be aligned exactly in the actual direction about the core. The electric coil can also be wound about the core at an angle of 5° or 10° or 15° or the like in relation to the axial direction. In all cases however, it is preferable that an angle between the alignment of the core and the axial direction, and an angle of the winding of the electric coil in relation to the axial direction, are less than 20° and in particular less than 10°.

The magnetorheological braking device according to the invention has many advantages. A significant advantage of the magnetorheological braking device according to the invention lies in that the electric coil is provided on the first brake component. A particular advantage is derived in that the magnetic field concentrators are fixedly connected to the core, or to the casing part, and are in particular integrally connected thereto. A particularly simple construction is made possible as a result. It has been surprisingly demonstrated that the magnetic field concentrators do not have to be configured as self-rotating or as rotatable rolling members but that stationary magnetic field concentrators in a reliable and reproducible manner make available a high increase in terms of the generatable braking moment. The magnetic field concentrators can either be separately manufactured and be fixedly connected to the core or the casing part and screwed, riveted, soldered/brazed, welded or optionally also adhesively bonded or press-fitted thereto, for example. Surprisingly, it also possible for the magnetic field concentrators to be attached to the casing part. Overall, a high braking moment is achieved with a small (and even smaller) installation space. As a result, the braking moment can overall be increased, or be maintained in the case of a smaller installation space. This opens up new possibilities, because a higher braking moment than hitherto can be generated with a considerably smaller installation space.

The magnetic field, or the magnetic field lines, preferably runs/run transversely through the first or inner brake component. An increase in the length of the first brake component in this instance, at the same diameter, increases the potential magnetic flux and thus the braking moment. The potential core diameter which in most cases cannot be larger for reasons of construction, in this instance does not restrict the magnetic flux.

In the magnetorheological braking device the magnetic field concentrators form transmission components. The magnetic field concentrators, or the transmission components, are at least partially, and in particular substantially completely, or completely, surrounded by a magnetorheological medium. Overall, a magnetorheological fluid is preferably used as the magnetorheological medium.

A plurality of magnetic field concentrators (as transmission components) are preferably disposed so as to be distributed across the circumference of the gap. The magnetic field concentrators do not rotate about themselves, but rotate conjointly with the brake component to which said magnetic field concentrators are fastened. As a result, a relative movement in the gap occurs during the rotation.

It is possible that even further transmission components are comprised in addition to the magnetic field concentrators, said further transmission components being configured as rolling members, for example. The term "rolling member" in the context of the present invention is understood to be a rotating member which is suitable to roll on the first or the second brake component in the gap.

In one preferred design embodiment, the magnetorheological braking device comprises a stationary mounting and at least two brake components, wherein one of the two brake components is connected in a rotationally fixed manner to the mount, and wherein the two brake components are continuously rotatable relative to one another, wherein one first brake component extends in the axial direction, and wherein the second brake component comprises a casing part which extends about the first brake component and is configured to be hollow and, at least in portions, cylindrical on the inside, wherein an encircling gap which is at least partially filled with a magnetorheological medium is configured between the first and the second brake component. The first brake component here comprises at least one electric coil and a core which is made from a magnetically conductive material and extends in the axial direction, wherein the core comprises a main body and, as magnetic field concentrators, outwardly projecting core contours such that an encircling gap having a gap height which is variable (across the circumferential angle) results, and wherein the electric coil is wound about at least one portion of the core such that a magnetic field of the electric coil runs through the core and through at least one core contour which projects outward and is configured as a magnetic field concentrator on said core, and through the (axially or radially) outwardly adjoining gap into a wall of the casing part. The magnetic field concentrators extend in particular across the external circumference of the core by way of at least one angular segment.

Each angular segment is in particular smaller than 150°.

The magnetic field concentrator is preferably disposed outside the angular segment (or the angular segments).

In particular, at least one angular range without magnetic field concentrators is provided. An angular range without magnetic field concentrators is preferably provided between at least two angular segments. At least two mutually opposite angular ranges without magnetic field concentrators are preferably provided. In particular, an angular range (without magnetic field concentrators) is larger than 10° or 15° or 30°, or preferably larger than 45° or larger than 60°, and may reach 75° or far beyond. In a specific design embodiment, an angular range has a size between 45° and 135°, and preferably between 75° and 135°.

The electric coil which in the axial direction is wound about the core is preferably received outside the angular segment (or the angular segments) on the core. The electric coil in this instance is in particular adjacent to the surface. This means in particular that the electric coil is received on the core at the angular range or the angular ranges.

The angular segments and the angular ranges preferably add up substantially or completely to a total of 360°. Angular segments and angular ranges here are preferably disposed in an alternating manner across the circumference.

In one preferred refinement of the invention, at least one magnetic field concentrator has a cross-sectional area that tapers toward the distal end.

At least one magnetic field concentrator is preferably configured so as to be radiused on the distal end.

It is preferable for the core to comprise a plurality of arms and/or for the casing part to comprise a plurality of arms as magnetic field concentrators, said arms projecting radially and/or axially. Arms project radially outward from the core and/or axially laterally from the core. Arms preferably project radially inward and/or also axially laterally from the casing part.

In all design embodiments it is preferable for at least one arm to be surrounded by an electric coil. A plurality of arms are particularly preferably in each case surrounded by one electric coil.

A radial length of a (radially projecting) arm is preferably smaller than a length of the arm in the axial direction.

At least one electric coil is preferably wound about the axis and in the core generates substantially a magnetic field substantially in the axial direction (radial coil).

In particularly preferred refinements at least one electric coil in the axial direction is wound about the core and generates substantially a magnetic field in the radial direction (lying coil).

In particular, the magnetic field concentrators form an external contour which is star-shaped (in the cross section).

Preferably, the casing part has a cylindrical internal surface across at least one axial portion A maximum (external) diameter of the electric coil in a radial direction within a, or the, coil plane is preferably larger than a minimum (external) diameter of the core in a radial direction transverse to the coil plane, in particular almost perpendicular or else perpendicular to the latter. However, the minimum diameter does not have to be perpendicular to the coil plane.

The electric coil preferably extends axially about at least one arm. A radial gap height between an external end of an arm and an internal surface of the casing part is in particular smaller than a radial gap dimension between the external surface of the first brake component beside the arm and the internal surface of the casing part. The surface of the main body can be configured beside the arm. A surface of a casting compound can also be beside the arm when said casting compound is filled, for example in order to reduce the volume for the magnetorheological medium and in particular the magnetorheological fluid (MRF).

The second brake component is preferably disposed so as to be axially displaceable on the first brake component so as to enable volumetric compensation in the event of temperature variations.

In particular, the second brake component by way of two bearing points of dissimilar external diameter is rotatably received on the first brake component so as to, by way of an axial displacement, cause a volumetric variation in a chamber configured between the first brake component and the second brake component.

It is preferable for at least one shielding device for at least partially shielding the sensor device from a magnetic field of the electric coil, or for shielding other magnetic fields, to be comprised.

The shielding device preferably comprises at least one shielding member that at least in portions surrounds the magnetic ring unit, wherein the shielding device comprises at least one separation unit disposed between the shielding member and the magnetic ring unit, and/or at least one magnetic decoupling device disposed between the shielding member and the casing part.

The separation unit and/or the decoupling device has/have in particular a magnetic conductivity which is less than that of the shielding member by a multiple.

The shielding device can be composed of a plurality of parts and comprise, for example, at least one, or else two, axial annular disk(s) and at least one annular sleeve.

It is preferable for the shielding device and the magnetic ring unit to be disposed so as to be mutually spaced apart. A spacer can be disposed therebetween. In simple design embodiments, a plastics material part such as an injection-molded part can be disposed therebetween and keep the parts at the defined mutual spacing.

A closed chamber (which is externally sealed) is preferably configured between the brake components. The second brake component at a first end of the closed chamber is rotatably received and in particular mounted (on a first bearing point) on the first brake component, wherein the closed chamber is filled substantially or completely with the magnetorheological medium.

The second brake component is preferably received and in particular mounted so as to be axially displaceable on the first brake component such that a volume of the closed chamber is varied as a result of the relative axial displacement of the brake components in order to make available compensation for temperature-related volumetric variations.

It is advantageous for the electric coil in the axial direction to be wound about the core and to generate substantially a magnetic field in the radial direction. This results in the advantage that a stronger braking moment can be achieved by increasing the length of a magnetic field concentrator in the axial direction. At the same time as the magnetic field concentrator is increased in length, the electric coil which extends in the longitudinal direction of the first brake component can also be increased in length (in an expedient manner). A larger passage area (cross-sectional area passed through by the magnetic field) for the magnetic field is made available by an electric coil which is configured so as to be longer in the axial direction. For this reason, an increase in length of the first brake component in the axial direction also causes an enlargement of the cross section of the core. As a result, a stronger braking moment can be achieved by increasing the length of the first brake component in the axial direction.

In preferred design embodiments, at least part of the magnetic field concentrators are composed of a magnetically conductive material. It is also possible for part of the transmission components to be composed of a magnetically non-conductive material. When magnetic field concentrators which are composed of a magnetically conductive material are used, and transmission components which are composed of a magnetically non-conductive material are simultaneously used, the magnetic field is thus concentrated in the region of the magnetically conductive magnetic field concentrators. This leads to the concentration of the magnetic field (increase in the magnetic field strength) and to a local amplification (magnetic field line concentration). For example, as a result, the magnetic field strength in the gap is increased from values of below 350 kA/m up to 1000 kA/m or more. The high (concentrated) field strength attracts more carbonyl iron particles from the magnetorheological liquid, this causing a carbonyl iron accumulation (clustering). This in turn permits higher shear stresses and thus higher braking moments to be generated.

As the correlation between a generatable braking moment and the strength of the magnetic field is not linear, and because the generatable braking moment becomes disproportionally stronger as the magnetic field increases in strength, a considerable amplification of the generatable braking moment can be achieved as a result (at an identical installation space/identical dimensions). However, it is also possible for a correspondingly smaller number of magnetic field concentrators to be chosen.

In the event that higher braking moments in the given installation space are required than in the prior art, while at the same time requiring (very) low production costs, the axial width of the magnetic field concentrator can be embodied so as to be very small and as a continuous disk (closed contour). For reasons of production costs, the star-shaped contour, or radially or axially projecting arms of a similar design with intervening spaces, can be dispensed with. The specially chosen (very) small width and the special contour of the magnetic field concentrator herein also concentrate the magnetic field and lead to the high field strengths (in the (annular) gap as described above, and thus to the concentration of carbonyl particles (clustering). While the field strengths in the effective gap, due to the larger transition area, are not as high as in the case of individual arms, said field strengths are sufficient for many applications, in particular in the presence of severe cost pressure.

In all design embodiments it is not necessary for the diameter of the first brake component to be increased in order for the generatable braking moment to be increased. This is therefore very important because many potential applications do not permit any larger external diameter of a braking device, or a larger external diameter would be a serious competitive disadvantage (for example an excessively large lateral adjustment wheel in a wristwatch or in a scrolling wheel of a computer mouse or in a thumb wheel on a motor vehicle). In order for the braking moment to be amplified/increased, the first brake component can be configured so as to be axially larger, this not being a disadvantage, or a smaller disadvantage, in terms of construction space.

In all design embodiments it is preferable for the casing part to be configured on a rotary button or a rotating wheel, or for said casing part to comprise the latter. The rotating part can preferably be configured integrally with the rotary button or the rotating wheel. In such design embodiments it is preferable for the rotary button, or the casing part, to be configured "pot"-shaped. The "lid" of the casing part can be integrally connected to a rotating part configured as a sleeve part, or be separately fastened thereto.

The casing part is preferably composed of a magnetically conducting material, or comprises a magnetically conducting sleeve part and makes available an external ring for the magnetic field. The magnetic field for generating a braking moment runs through the first brake component and passes through the gap on the magnetic field concentrators, the latter being configured to be magnetically conducting. From the magnetic field concentrators, the magnetic field enters the casing part. In the latter, the magnetic field lines run back before the magnetic field lines enter the first brake component again. In this way, a closed magnetic circuit, or closed magnetic field lines, are present.

Under the influence of a magnetic field during a relative rotation of the first brake component and the second brake component, a wedge effect is configured on the magnetic field concentrators, such as is described in principle in WO 2012/034697 A1. The disclosure of this publication is completely incorporated in this application. In the present invention, the braking moment is likewise generated as a result of the wedge effect on the magnetic field concentrators even when the magnetic field concentrators cannot rotate about themselves but are fastened to the first or the second brake component.

At least one radial wall thickness of the casing part, or of the sleeve part of the casing part, is preferably at least half the size of a gap width of the gap and/or a radial length of a magnetic field concentrator. A radial wall thickness (of the sleeve part) of the casing part is preferably larger than ¾ of the gap width of the gap. The radial wall thickness (of the sleeve part) of the casing part can in particular also be larger than a radial length of a magnetic field concentrator. As a result of a sufficient wall thickness of the casing part, which is composed of a magnetically conductive material, or of the sleeve part of the rotating part, it can be guaranteed that the desired field strength of the magnetic field can be generated in the region of the rolling members so as to be able to generate a high braking moment.

In all design embodiments it is preferable for a length of the first brake component in the axial direction to be larger than a length of a magnetic field concentrator in the axial direction. When the magnetic field concentrator in the axial direction is configured so as to be shorter than the first brake component, this leads to a three-dimensional concentration of the magnetic field in the peripheral region of the magnetic field concentrator. The magnetic field can practically pass through the gap only in those portions in which a magnetic field concentrator is situated.

A length of the gap in the axial direction is preferably at least double a length of a magnetic field concentrator in the axial direction. It is also possible and preferable for two or more magnetic field concentrators to be disposed successively in the axial direction.

The first brake component is preferably configured so as to be substantially cylindrical and comprises a cylindrical main body as the core, and the electric coil or the electric coils. It is also possible for a ball for mounting a rotary button to be comprised, said ball potentially being disposed centrally on the distal end so as to make available a simple mounting between the first brake component and the second brake component.

When using a "lying coil" the electric coil can be wound in axial grooves and transverse grooves of the cylindrical main body (of the first brake component). When using a "radial coil" the electric coil can be wound in an encircling groove. The respective grooves are preferably at least partially filled with a casting compound. It is prevented as a result that magnetorheological medium or magnetorheological fluid enters the region of the coil wires. This could lead to the fluid decomposing.

The mount preferably has a cable conduit. Connector cables for the coil and/or sensor cables and the like can be routed through the mount, or the cable conduit of the mount. Easy assembling and a cost-effective production are made possible as a result.

The mount preferably has a receptacle for connecting in a rotationally fixed manner to the first brake component. The mount here can receive the first brake component in a force-fitting and/or form-fitting manner. During operation, the braking moment between the first brake component and the second brake component is dissipated by way of the mount.

The mount preferably has a cylindrical running face for a bearing, and supports the casing part so as to be rotatable on the mount.

A seal for sealing the gap is preferably disposed on the cylindrical running face, wherein the seal is in particular disposed so as to be closer to the gap than the bearing. As a result, the bearing is reliably protected in relation to the magnetorheological medium. Such a design embodiment enables a compact construction and a reliable operation. The bearing can be, for example, a friction bearing or a rolling bearing.

The cylindrical running face is preferably hardened and/or has a surface quality which is superior to that of the radially outer surface of the receptacle. Manufacturing costs can be reduced as a result.

In advantageous design embodiments, the cylindrical running face has an external diameter which is smaller than an external diameter of the receptacle of the mount by at least 3 mm.

The mount is preferably fastened to a console or to another component.

In preferred refinements, a device component comprises at least one magnetorheological braking device as described above. Such a device component can comprise at least one user interface, an operating panel, a display, a touch-sensitive display with or without haptic feedback, and/or at least one sensor.

The use is also possible in a haptic operating device which comprises at least one magnetorheological braking device. Furthermore comprised are preferably a user interface, an operating panel, a display, a touch-sensitive display with or without haptic feedback, and/or at least one sensor. Besides enabling the operation, such a design embodiment simultaneously enables the display or output of information during the operation. In this way, an operating button which at the same time has an output display is made possible, for example.

In all design embodiments it is possible for a pressure-sensitive sensor to be attached to the mount, or for the mount to be assigned such a sensor. For example, a pressure-sensitive sensor can be attached in the mount. However, it is also possible for a piezo sensor to be attached to the lower part, etc. The mount can also be configured in two parts and register a mutual axial displacement of the two parts. Haptic feedback can take place in the process.

In all design embodiments it is preferable for a difference between an available internal diameter (of the sleeve part) of the casing part and an external diameter of the first brake component to be more than 3 mm and less than 90 mm. It is likewise preferable for an external diameter of the (sleeve part of the) casing part to be between 5 mm or 10 mm and 120 mm. A height of the casing part is preferably between 5 mm and 120 mm. In all design embodiments it is preferable for a control device to be comprised, said control device by way of the electric coil being configured to initiate a variable braking effect.

Overall, the present invention particularly preferably operates according to the fundamental principle of wedge-action clamping, wherein a magnetic field concentrator slides along the walls at a specific spacing, or optionally rolls on said walls. The wedge effect is created by a magnetic field so that a high braking moment is able to be generated.

Moreover, better scalability can be achieved by using a "lying coil". As a result, it is possible for a greater braking moment that is able to be scaled to be generated by means of longer magnetic field concentrators and an axially longer electric coil. The diameter of the first brake component here does not have to be chosen larger in order for a corresponding magnetic field to be directed through said first brake component, because the area of the core (cross-sectional area) becomes larger as the core is extended in axial length. The axial length can optionally also be significantly reduced if only a relative minor braking moment is required. The installation space can be accordingly adapted.

A further advantage lies in that the routing of the electrical connector cable for the electric coil is possible in a simple manner as with a view to volume production. A tightness of the magnetorheological braking device and scaling can be made possible by way of simple means.

In principle, a greater moment can be generated by the magnetorheological braking device across longer magnetic field concentrators, because the effective length is increased. At the same time, it is guaranteed by the larger core area that the magnetic field concentrators are always exposed to a corresponding magnetic flux density. The magnetic field strength at the "wedge" on the magnetic field concentrators can be chosen higher than in the prior art. Long magnetic field concentrators or a plurality of axially offset magnetic field concentrators to which a sufficiently intense magnetic field can be supplied can be used.

In particular when using a "radial coil", the magnetic field generated by the electric coil runs radially through the core, then through the magnetic field concentrators and is closed by way of the (sleeve part or) the casing part or the external cylinder. The magnetic field lines here are closed once in the one half of the casing part, for example the lower or left half, and once again in the other half of the casing part, for example the upper or right half. In simple design embodiments the magnetic flux thus runs substantially in a two-dimensional manner. The configuration of the magnetic field concentrators in terms of length or height is relevant here. As a result, arbitrary scaling in terms of the length can be achieved because the magnetic field transmission area increases conjointly. In contrast, in the case of electric coils ("radial coils") which are wound concentrically about the longitudinal direction of the first brake component, the cross-sectional area in the core remains identical and may form a bottleneck for the magnetic field as long as the diameter is not changed. However, a larger diameter of the first brake component also changes the requirement in terms of installation space, the installed dimensions and the weight of the magnetorheological braking device. It is advantageous that the rotating speed of rolling members does not vary with the stationary magnetic field concentrators now used, said rotating speed variation potentially being disadvantageous.

When longer magnetic field concentrators are used, the braking effect of a magnetic field concentrator that is elongate in the axial direction may be better than in the case of two shorter magnetic field concentrators of the same overall length. The reason for this is, inter alia, that the liquid has to be displaced over a longer distance because the periphery is farther away (hydrodynamic pressure).

In preferred design embodiments, the magnetorheological braking device has a diameter (of the sleeve part) of the casing part of between approximately 5 and 80 mm (+/− 20%), in preferred design embodiments approximately 10 to 40 mm. Overall, the invention makes available an advantageous magnetorheological braking device ("MRF" brake). The external diameter of the MRF brake here is in most instances predefined, in particular in the case of haptic applications. There are ergonomic guidelines in this regard. Therefore, the core cross section generally cannot be that easily enlarged, because the external diameter increases conjointly therewith (button wheel or thumb wheel or mouse wheel external diameter; area for the fingers). Moreover, a higher blocking moment is required as the external diameter increases, because the moment interval has increased for this reason. (The finger force, thus the (tangential) force between the activating finger(s) and the brake element, or the external surface of the brake element, must or should remain the same because the user is able to apply only a specific force, on the one hand, and the forces required on the fingers (at the fingertips) are important in terms of a comfortable feeling during activation (operating comfort)).

The electrical coil (electric coil) can extend axially in preferred design embodiments. The magnetic field generated by the coil in this instance runs radially through the core, then through the magnetic field concentrators, and is closed by way of the external cylinder (in each case by the opposite halves). This remains identical, irrespective of the height (or the length) of the rolling members or the MRF brake.

The invention achieves the objective of obtaining an ideally simple but nevertheless readily scalable MRF brake with a high braking moment and at the same time a compact external diameter.

A flat material of copper or any other suitable material can be used instead of a (cylindrical) coil wire.

The core, the magnetic field concentrators and the external cylinder can be made from a simple steel (for example S235), without high requirements in terms of the surface characteristic and hardness, said steel preferably having good magnetic properties.

The core, including the electric coil and the casting compound, are preferably centered in a "mount" and fixed (force-fitting or form-fitting connection), and the counter-torque by way of said "mount" can be dissipated to a console, a base plate, a receptacle plate or a housing. The mount preferably has a bore through which the cables are routed. A sealing element (for example an O-ring) seals the cable in relation to the mount or the interior space, so that no liquid from the interior space can makes its way to the outside by way of the cable. In addition to the (coil) cable, a temperature sensor cable or another sensor cable can also be routed through this opening.

The mount can also be produced from a material that is different from that of the core, the rolling member or the external cylinder. The reduction in the diameter of the mount on the running face has the advantage that the frictional radius for the sealing element is decreased, this reducing friction overall. Moreover, due to the resulting increased construction height, a bearing element which has a bearing external diameter that is identical to the internal diameter of the casing part can be used. This reduces the production costs of the casing part; no production-related shoulder (undercut) is required. The preferred rolling member height is between 3 mm and 6 mm, but may also be 1 mm or 2 mm. It is difficult to obtain good bearings or sealing elements in this range, unless the internal diameter of the mount achieves additional installation height.

A decorative element, or another element, for example a rubberized button, can be fitted over the external cylinder or the casing part.

A ball or a ball-shaped or ball-like component (may also be semi-spherical) can preferably be seen axially at the top, between the external cylinder and the casting compound. Said ball guides the two parts relative to one another. The ball is preferably fixed in the casting compound, and the inner axial end side of the external cylinder rotates relative thereto. A simple, low-friction and cost-effective bearing (bearing point) is achieved in this way. A conical shape or the like is also possible. However, any other type of mounting (for example a friction mounting or a rolling mounting) can also be chosen instead of this type of mounting.

At least one component that is passed through by the magnetic field is preferably at least partially or completely composed of the material FeSi3P.

A star-shaped contour can in principle be applied not to the core but also, from the inside to the surrounding casing part or sleeve part. Such a construction can offer advantages in the basic design of the coil. Space is moreover gained. In this case too, different variants of coils can be chosen. An axial coil, or a "lying coil", is also possible. A coil that is wound about the rotation axis is also possible. Advantageously, there is no more core material present radially outside the electric coil, because the magnetic field otherwise would be able to be closed thereby, this potentially resulting in magnetic losses. Depending on how the "lying coil" is positioned, it is also conceivable that more than one "lying coil" is used. A radial coil would also be readily conceivable, because the field is closed simultaneously by all "teeth" or magnetic field concentrators in this way.

In preferred refinements of all design embodiments, the maximum generatable torque (field strength profile in the effective gap; wedge effect), and/or the response time (the time until the moment prevails in the event of abrupt energizing or current leaps=step response) is a function of the chosen inlet angle at the arms, or the respective distal ends of the magnetic field concentrators. The angle generated by the external design of the radial end of the arms and of the mating face, and the length of the face, influence that maximum generatable torque and the response time when a magnetic field, or the field strength, is being built up in the effective gap. Flatter (smaller) inlet angles and/or longer faces increase the achievable moment. Larger (steeper) inlet angles and/or shorter faces decrease the response time.

Further advantages and features of the present invention are derived from the exemplary embodiments which are explained hereunder with reference to the appended figures.

DETAILED DESCRIPTION OF THE INVENTION

FIGS. 1a to 1f shows a plurality of device components 200 according to the invention, in which the magnetorheological braking device 1 can be used. The device components 200 here are in each case embodied as a haptic operating device 100.

Figure 1A:
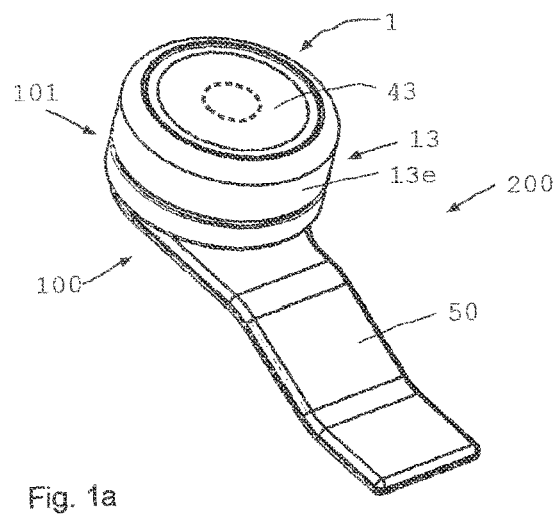
FIGS. 1a-1f show schematic three-dimensional views of device components having a magnetorheological braking device.

FIG. 1a shows a haptic operating button 101. The operating button is fastened by way of the console 50. The operating button 101 is operated by way of the casing part 13 or the sleeve part 13e. The user interface 43 can be additionally utilized for transmitting information.

Figure 1B:
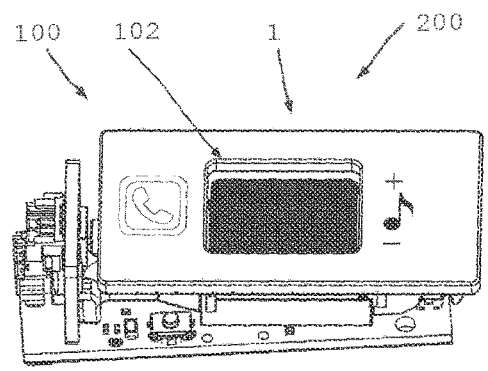

The device component 200 in FIG. 1b is illustrated as a thumb wheel 102 with a haptic operating device 100. The thumb wheel 102 is preferably able to be used in steering wheels, for example. However, the thumb wheel is not limited to this specific application. In general, the thumb wheel 102 can also be used with any other finger, depending on the installation situation.

Figure 1C:
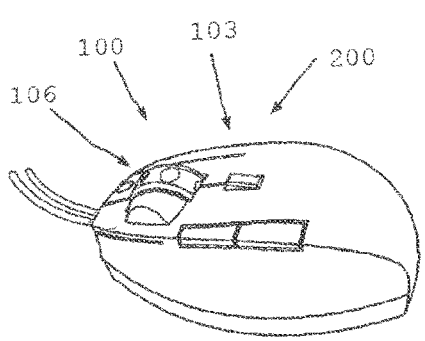
Figure 1D:
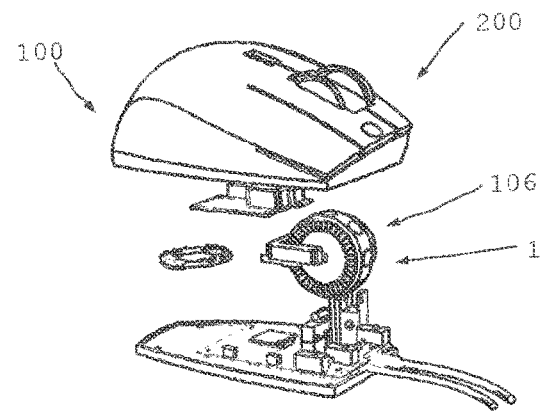

The device component 200 in FIG. 1c and FIG. 1d is embodied as a computer mouse 103. The haptic operating device 100 is disposed in the mouse wheel 106. The magnetorheological braking device 1 can be utilized for controlling haptic feedback.

Figure 1E:
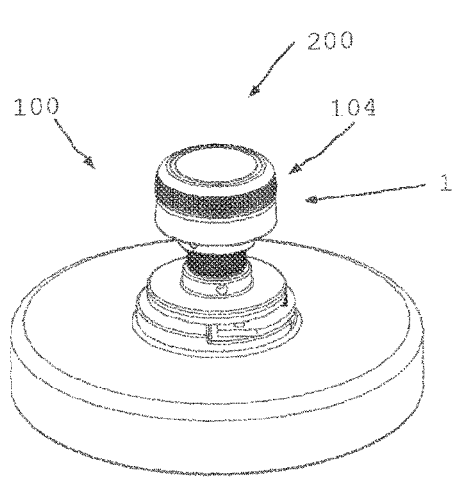
Figure 1F:
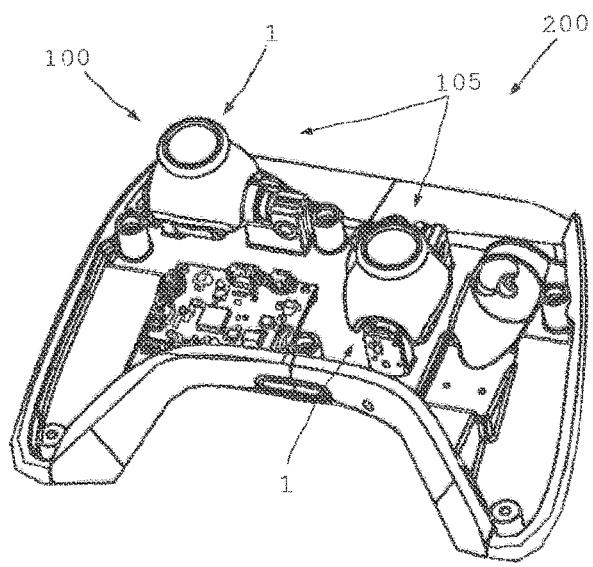

FIG. 1e shows a joystick 104 as a haptic operating device 100 in which a magnetorheological braking device 1 is disposed. Moreover, the magnetorheological braking device 100 is preferably also able to be used in a game pad 105 so as to provide haptic feedback to the player as a function of the game situation, cf FIG. 1f.

In these exemplary embodiments, the magnetorheological braking device 1 has a casing part 13 or a rotating part 13, or a sleeve part 13e, which is rotatably received. The torque required for rotating the casing part 13 or the rotating part 13 is adjustable.

A user interface 43 can be disposed on the upper side of the magnetorheological braking device 1. Such a user interface 43 can be configured, for example, as a display device or else as a touch-sensitive input possibility (touchpad, control by movement or gesture, image recognition, etc.).

For example, a haptic operating device 100 can be used for operating machines, medical equipment or for use in and for the motor vehicle. The use in other devices or apparatuses is also possible.

Figure 2:
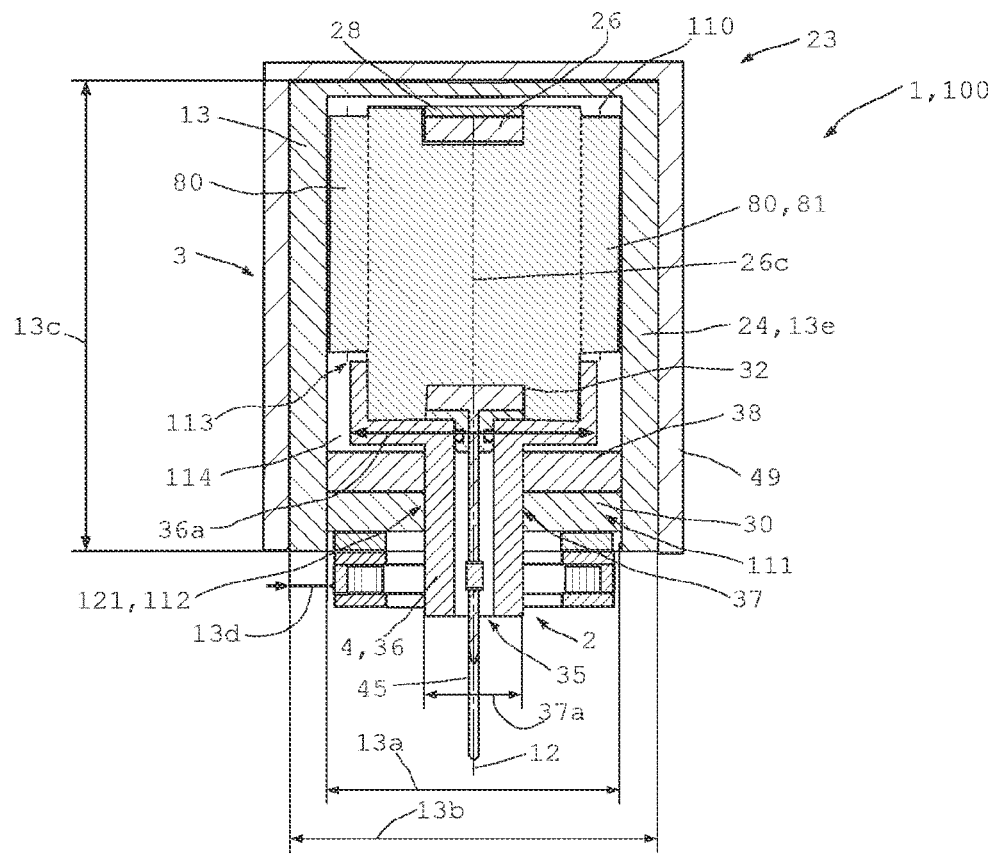
FIG. 2 shows a cross section of a further device component having a magnetorheological braking device.

FIG. 2 shows a device component 200 according to the invention having a magnetorheological braking device 1 according to the invention, in a sectional view. Transverse grooves 32 in which the electric coil 26 of the magnetic field generator 113 at the axial ends of the core 21 are wound can be seen. The electric coil 26 in the axial direction is wound about the axis 12 and generates substantially a magnetic field in the radial direction. A casting compound 28 is in each case provided in the axial direction for closure at both ends. A separate seal 38, for example by way of the plotted O-ring or the like, is provided in the region of the cable conduit 35.

A length, or height 13c, of the magnetic field concentrator 80, 81 of the casing part 13, or of the sleeve part 13e, or of the second brake component 3 in the axial direction 20 is preferably between 1 mm and 100 mm, or between 5 mm and 90 mm. A covering 49 can be attached to the outside of the second brake component 3 so that the external appearance of the rotary button 23 is determined substantially by the surface of the covering 49.

The material of the sleeve part 13e or of the casing part 13 overall is magnetically conducting and serves for closing the magnetic circuit. A wall thickness 13d between the external diameter 13b and the internal diameter 13a of the sleeve part 13e is preferably half the size of a radial extent of the magnetic field concentrators 80.

The diameter 36a of the receptacle 36 is preferably significantly larger than the diameter 37a of the cylindrical running face 37. The friction on the seal 38 is reduced as a result. Moreover, standardized bearings can be used.

It is also possible for the core 21 and the mount 4 to be embodied in two parts. The separation preferably runs along the centerline drawn in FIG. 2, this resulting in a left and a right (core) half. The two core halves can be mutually spaced apart by a magnetically non-conducting element (for example a seal). The casting compound volume 28 in this instance is preferably part of the core half (halves), this resulting in a semicircular element having an encircling groove on the separation face for the electric coil 26. Furthermore preferably, the receptacle 36 is also divided into two halves. One receptacle half, conjointly with a core half, can form one part (be integrally embodied), or one core half can be integrally embodied with a complete receptacle unit 36.

The haptic operating device 100 having the magnetorheological braking device 1 here is unilaterally mounted. The second brake component 3 here is received only at the first end 111 of the closed chamber 110, on an end portion 121 of the first brake component 2, that is to say that the second brake component 3 is mounted only by the mounting 30 at the first bearing point 112. In the event of a variation of the volume 114 within the closed chamber 110, the second brake component 3 can easily move back and forth. It is again assumed here that the first brake component 2 is stationary. In this case, part of the diameter 116 of the first brake component 2 moves in or out at the first bearing point 112. The volume 114 of the closed chamber 110 changes. Advantageously, the system within the freedom of movement provided is practically always at the ambient pressure. Any additional stressing of the seal 38 is prevented.

Figure 3A:
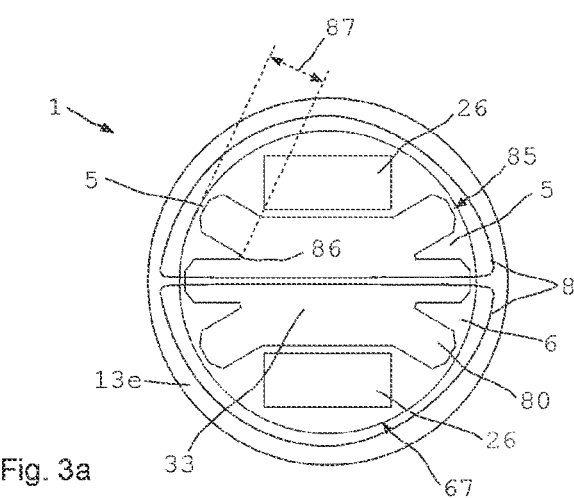
FIGS. 3a-3b show schematic cross sections of the magnetorheological braking device as per FIG. 2.
Figure 3B:
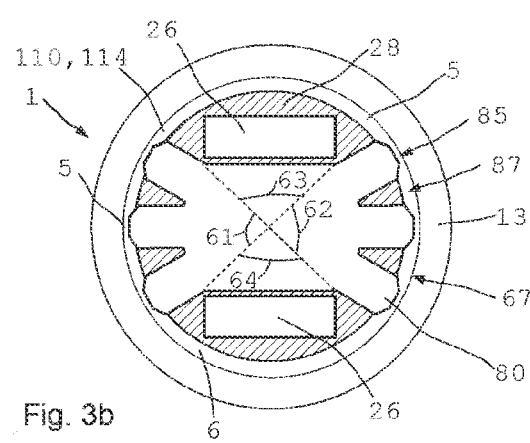

FIGS. 3a and 3b show various schematic cross sections of the magnetorheological braking device 1, said cross sections being able to be used in the device components 200 as per FIG. 2, and also in other exemplary embodiments.

The inner brake component 2 is configured to be stationary, and is surrounded by the continuously rotatable brake component 3. The second brake component 3 has a casing part 13 which is rotatable about the first brake component 2 and is configured so as to be hollow and cylindrical on the inside. The encircling gap 5 between the first brake component 2 and the second brake component 3 can be seen. The gap 5 here is at least partially, and in particular completely, filled with a magnetorheological medium 6.

The first brake component 2 has the core 21, which extends in the axial direction 20 and is made of a magnetically conductive material, and an electric coil 26 which in the axial direction 20 is wound about the core 21 and defines a coil plane 26c. The magnetic field 8 of the electric coil 26, transversely to the axial direction 20, extends through the first brake component 2, or the core 21.

It can be clearly seen that a maximum external diameter 26a of the electric coil 26 in a radial direction 26d within the coil plane 26c is larger than a minimum external diameter 21b of the core 21 in the radial direction 25 transverse, and for example perpendicular, to the coil plane 26c.

The magnetic field concentrators 80 protrude radially outward from the main body of the core 21. The profile of the magnetic field 8 in an exemplary manner is plotted in FIG. 3a.

The electric coil is disposed outside the angular segments 61 and 62. No magnetic field concentrators 80 are situated outside the angular segments 61 and 62. One angular segment 63, 64 without magnetic field concentrators 80 is in each case disposed between the angular segments 61 and 62. The windings of the electric coil 26 here run in mutually opposite angular ranges 63, 64.

The cores 21 have outwardly projecting arms 83 as magnetic field concentrators 80, which from the main body 33 project radially outward. The chamber 110 between the core 21 and the casing part 13 in FIGS. 3a and 3b is completely filled with MRF.

The maximum external diameter 26a of the coil 26 is larger than the minimum core diameter 21b. The radial extent of the gap 5 varies across the circumference. There is only a minor radial gap height 85 at the outer ends of the magnetic field concentrators 80, while a radial gap dimension 87 between the brake component 2 and the brake component 3 at other locations is significantly larger.

However, the radial gap height 85 between an outer end of an arm 83 and an internal surface 67 of the casing part 13 is significantly smaller than a radial gap dimension 87 between the external surface 86 (i.e. the core 21 per se or else a surface of a casting compound 28 on the core) of the first brake component 2 beside the arm 83 and the internal surface 67 of the casing part 13.

FIG. 3b shows a variant of FIG. 3a, in which the chamber 100, in order to decrease the MRF volume, by way of a cylindrical portion is filled with casting compound 28. As a result, the required volume 114 of MRF drops. The radial gap dimension 87 is considerably reduced, but remains substantially larger (at least by a factor of 2 or 3 or 5 or 10) than the radial gap height 85. It is ensured as a result that the described wedge effect arises. The MRF particles 19 interlink in the acute regions 10 and form a type of wedge which leads to a significant braking moment. The magnetic field concentrators 80 in FIGS. 3a and 3b form a type of radial arms 83.

Figure 4:
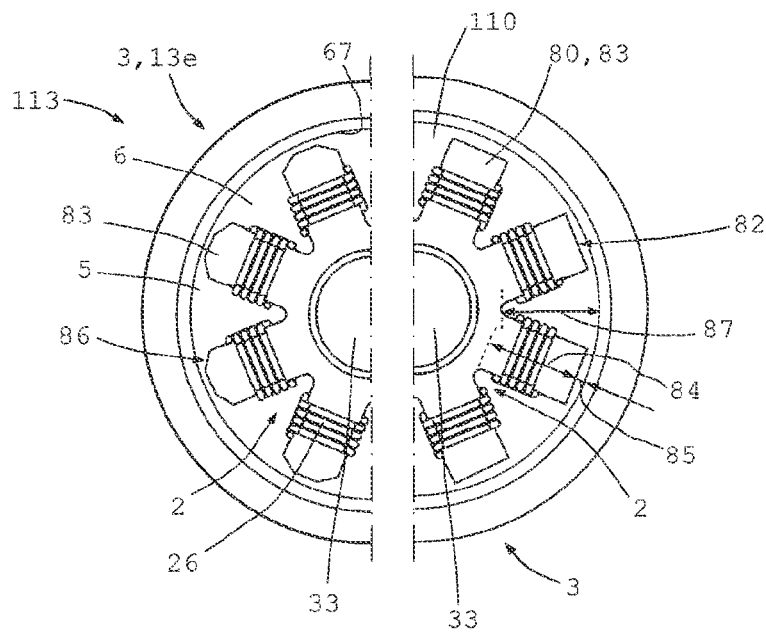
FIG. 4 shows another cross section of a magnetorheological braking device.

FIG. 4 shows two schematic cross sections of other embodiments in which the magnetic field concentrators 80 are configured by individual, outwardly projecting radial arms 83, wherein the radial arms 83 are configured integrally with the core 21 and are composed of a material which is positively magnetically conducting.

Each individual arm 83 here is wrapped by an electric coil 26 of the magnetic field generator 113. The electric coils 26 are preferably conjointly actuated. The distal ends 82, here the radially outer ends 82, of the arms 83 can be configured so as to be wedge-shaped, radiused or else angular. In the case of radially inwardly projecting arms 83 as magnetic field concentrators 81, the radially inner end as the distal end 82 can accordingly be configured so as to be wedge-shaped, radiused or else angular. The maximum generatable moment and the response time are influenced by the shape.

The arm height, or the radial length, of the arm 84 is significantly larger (by a factor of 10, 50, 100 and far more) than the radial gap height 85 between a distal end of an arm 82 and an internal surface 67 of the casing part 13.

However, the radial gap height 85 between an external end, or distal end 82, of an arm 83 and an internal surface 67 of the casing part 13 is significantly smaller than a radial gap dimension 87 between the external surface 86 (core 21 or else a surface of a casting compound 28) of the first brake component 2 beside the arm 83 and the internal surface 67 of the casing part 13. The ratio is preferably more than 2, 5 or 10 or more. A certain enlargement is important with a view to the formation of the wedge.

Figure 5:
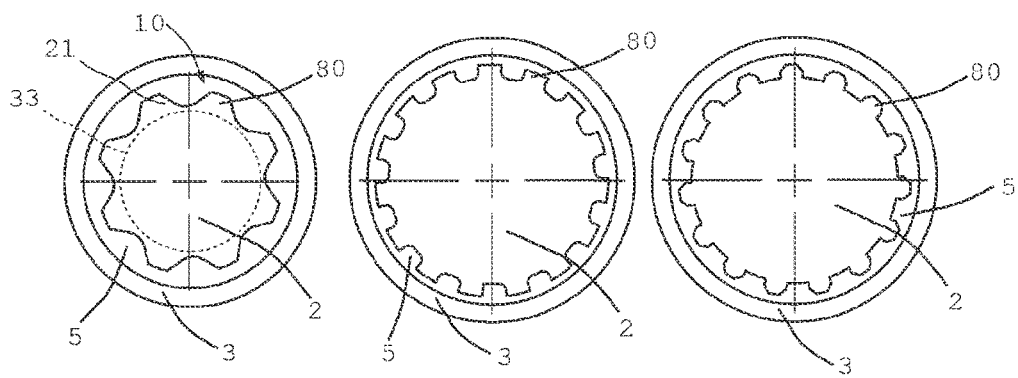
FIG. 5 shows further schematic cross sections of a magnetorheological braking device in a sectional view.

Three different external contours of a core 21 on a casing part 13 which is configured with a cylindrical cavity are depicted in FIG. 5. The radially outwardly projecting magnetic field concentrators 80 may have different shapes. The outwardly protruding magnetic field concentrators 80 form a gap 5 which is variable across the circumference, so that the magnetic field 8 in the region of the magnetic field concentrators 80 is bundled when said magnetic field 8 transitions from the core 21 into the casing part 13.

A variant in which the magnetic field concentrators 81 project inward and the core 21 is provided on the inside is illustrated in a purely schematic manner by dashed lines in the left image of FIG. 5. In this instance, a reversed image is created. Different properties can be achieved by the shaping of the distal ends 82 of the magnetic field concentrators 80 and/or 81. In this way, the focus can be set on a higher braking moment or a faster response time.

Figure 6:
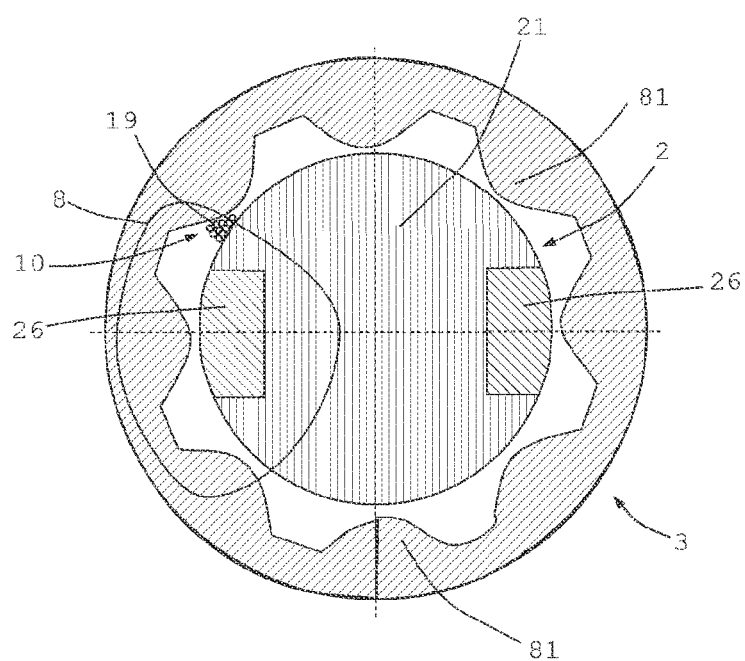
FIG. 6 shows yet another schematic cross section of a magnetorheological braking device.

FIG. 6 shows a schematic variant having a central cylindrical core 21 and a casing part 13, magnetic field concentrators 81 projecting periodically in a radially inward manner from the latter. A highly schematic magnetic field line 8 which radially passes through the gap 5 between the core 21 and a magnetic field concentrator 81 is plotted in the drawing. A cluster of the particles 19 of the MRF interlinks at the constriction and in an acute region 10 forms a wedge which generates a high braking moment.

Besides the variant illustrated in which the electric coil 26 in the axial direction is wound about the core 21, a variant in which the electric coil 26 is wound radially about the rotation axis 2 is also possible.

FIGS. 7a to 7e show a further embodiment of a device component 200 which possesses a magnetorheological braking device 1 and comprises brake components 2 and 3. A "lying or axial coil" is again used, in which the electric coil 26 in the axial direction 20 is wound about the core 21, and said electric coil 26 again has a maximum radial coil diameter 26a which is larger than a minimum core diameter 21b of the core 21. Here too, magnetic field concentrators 80 which project radially outward and concentrate the magnetic field in the thin radial gap and ensure the wedge effect are provided. This is not conventional shear damping, because the gap height of the gap 5 massively varies across the circumference. Horizontal lines which show the radial starting point for the magnetic field concentrators 80 are plotted in the drawing here. The gap height outside the magnetic field concentrators 80 is very much larger (here by a factor of >50 or 100 or 1000).

The device component 200 here is embodied as a haptic operating device 100 and in detail embodied as an operating button 101. The second brake component 3 at the first end 111 of the closed chamber 110 is received on the bearing point 112. Moreover, the second brake component 3 at the second bearing point 118 at the second end 115 of the closed chamber 110 is received on the first brake component 2. As a result of the mounting, forces in the (global) radial direction 122 are absorbed, while the brake components 2, 3 are furthermore axially displaceable relative to one another.

The mounting here is implemented by means of a stub axle 119 having the diameter 117 at the second bearing point 118. The annular seal 46 prevents the magnetorheological medium 6 flowing into the region behind the stub axle 119.

The diameter 117 at the second bearing point 118 here is embodied so as to be considerably smaller than the diameter 116 at the first bearing point 112. In this way, a volumetric variation in the event of an axial displacement is enabled here too. Temperature-related volumetric variations and volumetric variations caused by leakages can be compensated for. To this end, a relative axial displacement of the first brake component 2 in relation to the second brake component 3 takes place. In order for the throttle effect by way of the gap 5 in the event of an axial displacement to be reduced, a compensation duct 120 which connects the two regions close to the bearing points 112, 118 can be provided.

Moreover, a sensor device 70 for detecting an angular position of the haptic operating device 100 is present here too. The magnetic field sensor 72 is integrated in the stationary receptacle 4, or the first brake component 2. The cable 45 of the magnetic field sensor 72, i.e. the sensor line 73, at the receptacle 36 is routed outward by way of the cable conduit 35.

Figure 7A:
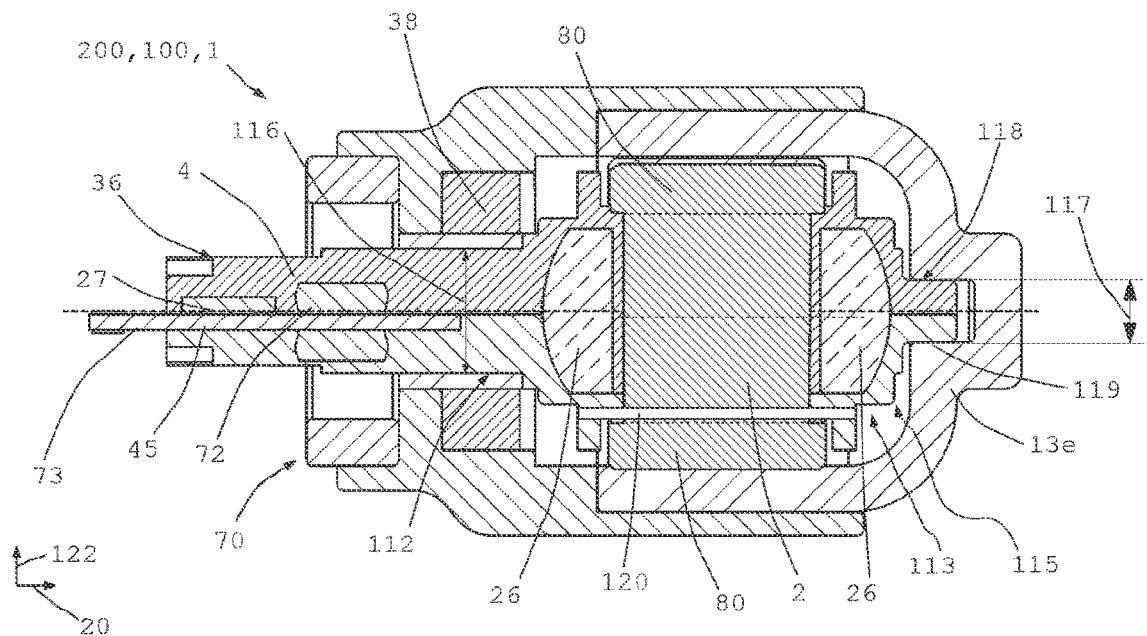
FIGS. 7a-7e show further device components.
Figure 7B:
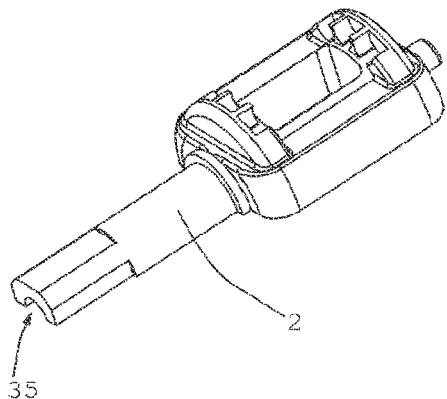
Figure 7C:
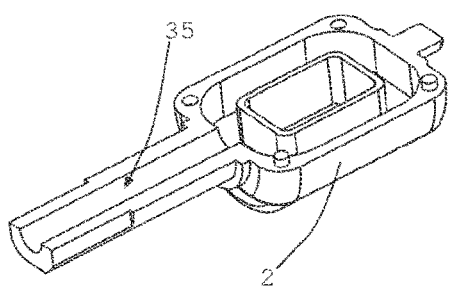

As is illustrated in FIGS. 7b and 7c, the first axle part, or the mount 4 of the brake component 2, can preferably be embodied in two parts. As a result, the assembling of the electrical lines, and in particular of the sensor line 73, within the first brake component 2 is simplified above all. The cables can be installed by way of the open cable conduit 35.

Figure 7D:
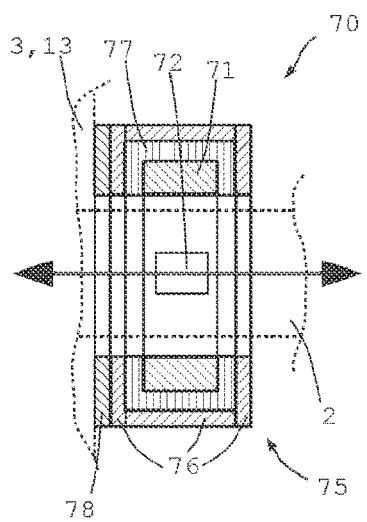
Figure 7E:
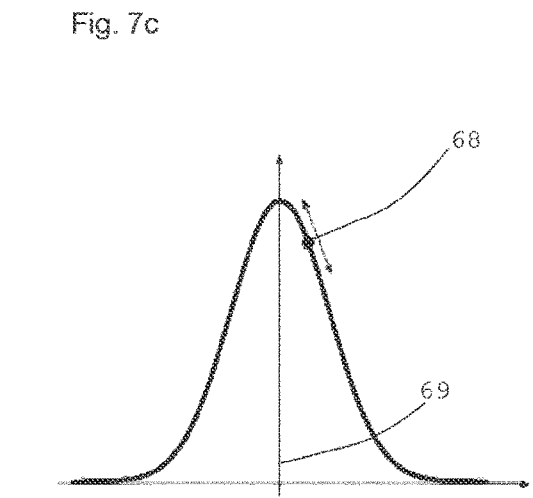

The sensor device 70 is illustrated once more in detail in FIG. 7d. The first brake component 2 and the second brake component 3, here embodied as the rotating part, are only indicated (by dashed lines). The sensor device 70 by way of the decoupling device 78 is supported in a magnetically decoupled manner on the rotatable second brake component 3. The shielding device 75 here is composed of three shielding members 76 which mitigate straying of the magnetic field 8 of the electric coil 26. Moreover present is also a separation unit 77 for the magnetic separation. The magnetic ring unit 71 is utilized for measuring the orientation, or the rotation angle, of the magnetorheological braking device 1. The magnetic field sensor 72 is disposed within the first brake component 2. Moreover, small relative axial displacements can be utilized for detecting a depressed operating button 101, for example, cf. FIG. 7e.

The received signal 68 of the sensor device according to the illustration of FIG. 8 changes as a result of an axial displacement. FIG. 8 shows the profile of the amplitude 69 of the signal 68 detected by the magnetic field sensor 72, illustrated as a function of the axial displacement of the brake components 2, 3 (horizontal axis). The amplitude 69 of the detected signal 68 varies as a result of an axial displacement of the magnetic field sensor 72 in relation to the magnetic ring unit 71. An axial displacement of an operating button 101, or depressing the latter, or a lateral displacement of a mouse wheel 106, for example, or of other components can be detected.

The rotation angle can also be detected by the same sensor, or magnetic field sensor 72, wherein the direction of the magnetic field 8 is determined in order for the rotation angle to be detected. The intensity determines the axial position. An activation of the momentary contact switch 74 can be concluded from a variation of the signal 68. This is advantageous because a single (multi-dimensional) Hall sensor can be used for determining the angular position and for determining an axial position.

Figure 8A:
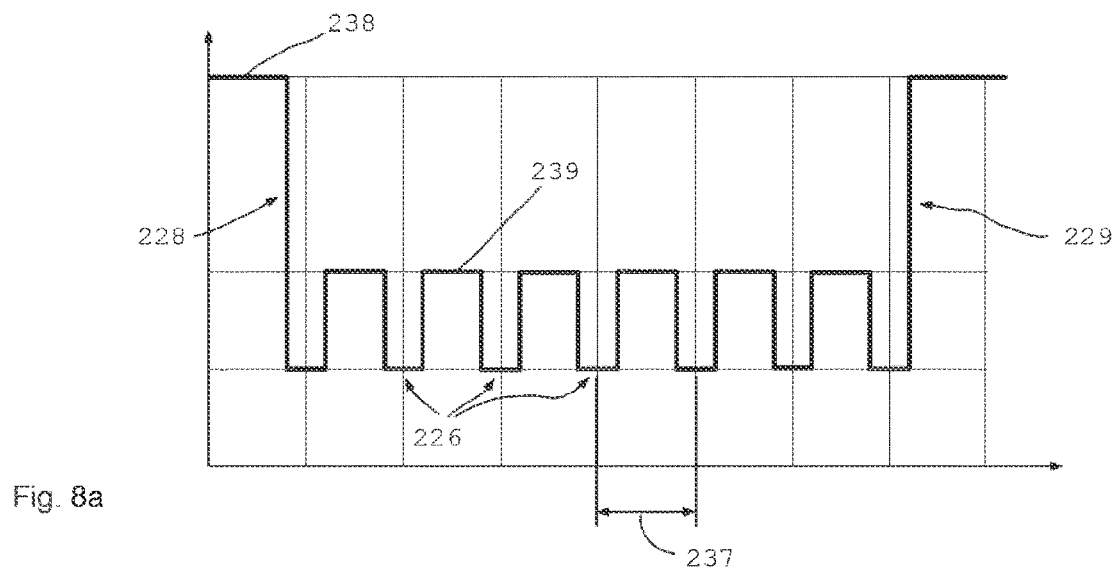
FIGS. 8a-8c show potential torque profiles across the rotation angle of a magnetorheological braking device of a device component according to the invention.
Figure 8B:
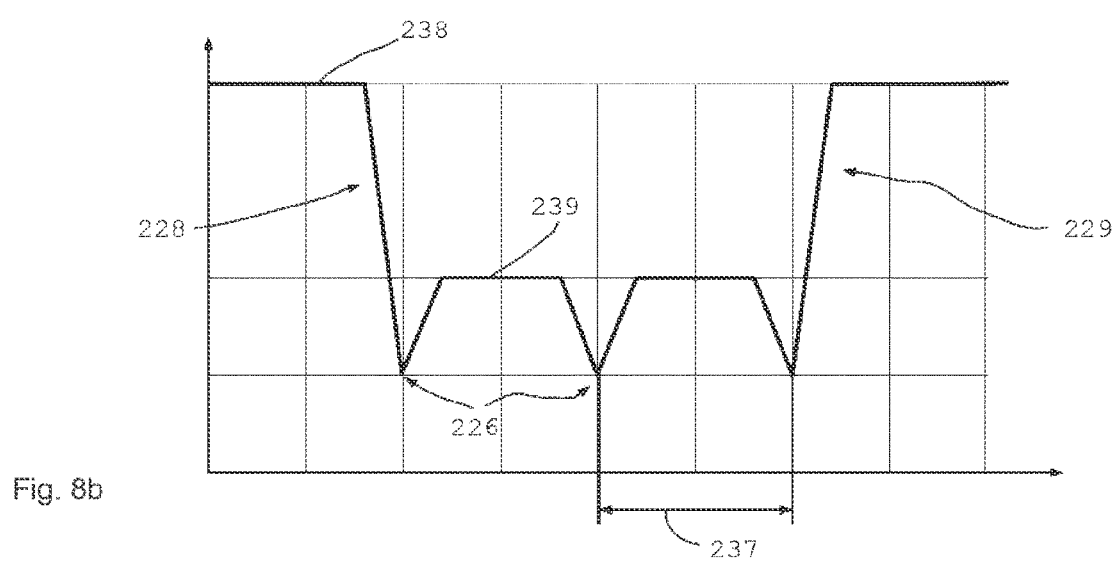
Figure 8C:
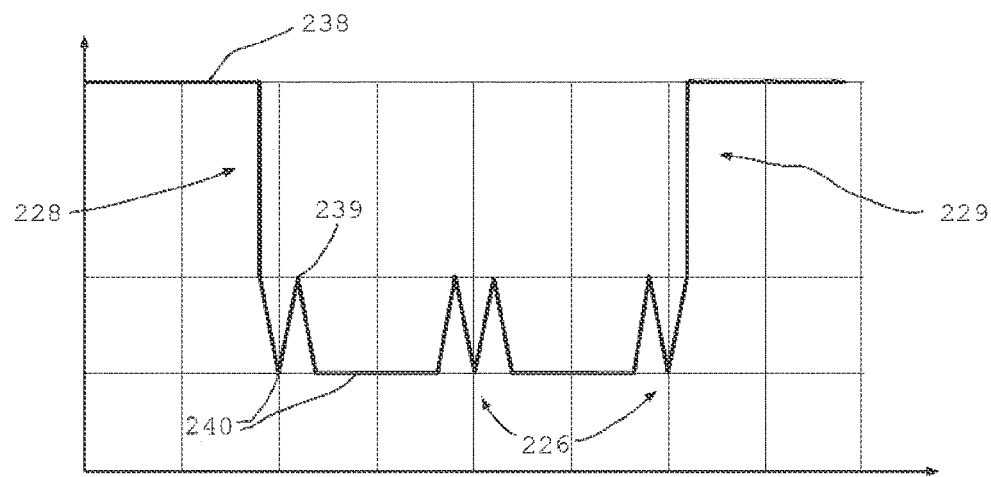

Potential variants of embodiments for controlling a dynamically generated magnetic field 8, or a dynamically generated braking moment, as a function of the rotation angle are illustrated in FIGS. 8a, 8b and 8c.

FIG. 8a here shows a variant in which a rotary button is used as a haptic operating aid. Illustrated is the rotational resistance over the rotation angle. A left terminal detent 228 and a right terminal detent 229 can be generated by the control device 27. As the rotary button 23 is rotated further, an intense magnetic field 8, or detent moment 238, is generated thereon, as a result of which the rotary button 23 puts up a high resistance in relation to a rotating movement. The user receives the haptic feedback of a terminal detent 228, 229.

Rippling of the rotating movement can take place, or be generated, in the process. This can be used, for example, for navigating a graphic menu and selecting menu items. A first ripple point 226 which during operation corresponds to a first menu item, for example, is provided here directly beside the left terminal detent 228. If the next menu item is to be selected, the rotary button 100 has to be rotated in the clockwise manner. To this end, the dynamically generated, more intense magnetic field 8, or the ripple moment 239, or the frictional moment of the latter, has to be overcome before the next ripple point 226 is reached. In FIG. 8a, a respective constant magnetic field 8 for a specific angular range is in each case generated at the ripple points 226 and the intervening regions, said magnetic field 8 at the ripple points being significantly less intense than in the intervening regions, and being again considerably less intense than at the detents 228, 229.

An angular spacing 237 between individual ripple points is dynamically variable and is adapted to the number of available ripple points 226, or menu items.

FIG. 8b shows a variant in which the magnetic field does not abruptly increase toward the terminal detents 228, 229, but assumes a steep profile. Furthermore, ramp-type gradients of the magnetic field are in each case provided in both directions of rotation at the ripple points 226, as a result of which the rotational resistance increases in the corresponding directions of rotation. Here, only three ripple points 226 are made available by the same operating device 100, the angular spacing 237 of said ripple points 226 being larger than in the example according to FIG. 8a.

FIG. 8c shows a variant in which a lower frictional resistance is present between individual ripple points 226 and a more intense magnetic field 239 is in each case generated only directly adjacent to the ripple points 226, so as to enable latching at the individual ripple points 226 and simultaneously make available only a minor rotational resistance between individual ripple points 226. The base moment 240 is effective therebetween.

In principle, a mix of the operating modes and the magnetic field profiles of FIGS. 8a, 8b and 8c is also possible. For example, in the case of dissimilar sub-menus, a correspondingly different adjustment of the magnetic field profile can take place.

In all cases it is also possible, for example in the event of a ripple, that switching no longer takes place between a lower and a higher amperage of identical polarity (thus, for example, +0.2 to +0.8 A=ripple) as to date, but takes place in an alternating manner with variable polarity, i.e. from +0.2 to +0.8 A and then for the next ripple by way of −0.2 A to −0.8 A, and then for the next moment peak from +0.2 A to +0.8 A, etc.

In all cases it is also possible for the operating modes of FIGS. 8a, 8b and 8c, or a mix of the operating modes, to be selected by voice commands. The user by way of voice input (using local or remote voice recognition, for example by way of Alexa, Amazon Echo, Siri, Google voice input, etc.) selects a function (volume, station, etc.). The magnetorheological braking device 1 then makes available a corresponding operating mode (volume=ripple with increasing braking moment for increasing volume; station selection=ripple with different increments and a minor braking moment therebetween until the station is found).

The preferably low-alloy steel can contain a residual magnetic field. The steel is preferably demagnetized regularly or when required (inter alia by a special alternating field).

The material FeSi3P (silicon steel), or a material of a related generic type, is preferably used for the components passed through by the magnetic field 8.

In all cases, voice or noise control can be performed. The braking device 1 can be adaptively controlled using the voice control.

When the rotating unit is not being rotated, i.e. when the angle is constant, the current is preferably continuously reduced over time. The current can also be varied as a function of the speed (angular speed of the rotating unit).

LIST OF REFERENCE SIGNS

1 Magnetorheological braking device
2 Brake component
3 Brake component
4 Mount, receptacle
5 Gap, duct
5b Gap height
6 Medium
8 Field, magnetic field
10 Acute region
12 Axis
13 Casing part, rotating part
13a Internal diameter
13b External diameter
13c Height
13d Wall thickness
13e Sleeve part
19 Magnetic particles
20 Axial direction
21 Core
21b Minimum diameter
23 Rotary button
24 External ring
25 Radial direction
26 Coil
26a Maximum diameter
26c Coil plane
26d Radial direction to 26c
27 Control device
28 Casting compound
30 Mounting
32 Transverse groove
33 (Cylindrical) main body
35 Cable conduit
36 Receptacle
36a External diameter
37 Cylindrical running face
37a External diameter
38 Seal
43 User interface
45 Cable
46 Annular seal
49 Covering
50 Console
61 Angular segment
62 Angular segment
63 Angular range
64 Angular range
67 Internal surface of 13
68 Signal
69 Amplitude
70 Sensor device
71 Magnetic ring unit
72 Magnetic field sensor
73 Sensor line
74 Momentary contact switch
75 Shielding device
76 Shielding member
77 Separation unit
78 Decoupling device
80 Magnetic field concentrator
81 Magnetic field concentrator
82 Distal end
83 Arm
84 Radial length of the arm
85 Gap height
86 External surface
87 Gap dimension
100 Haptic operating device
101 Operating button
102 Thumb wheel
103 Computer mouse
104 Joystick
105 Gamepad
106 Mouse wheel
110 Closed chamber
111 First end of 110
112 First bearing point
113 Magnetic field generator
114 Volume of 110
115 Second end of the closed chamber
116 Diameter of first bearing point
117 Diameter of second bearing point
118 Second bearing point
119 Stub axle
120 Compensation duct
121 End portion of 2
122 Radial direction (global)
200 Device component
226 Ripple point
228 Terminal detent
229 Terminal detent
237 Angular spacing
238 Detent moment
239 Ripple moment
240 Base moment

The invention claimed is:

1. A magnetorheological braking device comprising:
a stationary mount, a first brake component, and a second brake component;
one of said first or second brake components being rotationally fixed to said stationary mount, said first and second brake components being continuously rotatable relative to one another;
said first brake component extending in an axial direction, said first brake component having at least one electric coil and a magnetically conductive core extending in said axial direction;
said second brake component having a hollow casing extending about said first brake component;
said first brake component and said second brake component being disposed to form an encircling gap therebetween, said encircling gap being filled with a magnetorheological medium;
said core and/or said casing having magnetic field concentrators protruding into said encircling gap such that said encircling gap has a variable gap height;
said at least one electric coil being wound about at least one portion of said core, and said at least one electric coil being configured to generate a magnetic field through said core, said magnetic field concentrators, and said encircling gap into a wall of said casing; and
said core having at least one angular segment, and said magnetic field concentrators extending across an external circumference of said core through said at least one angular segment
said electric coil being wound about said core in said axial direction and said electric coil being disposed on said core outside of said angular segment.

2. The magnetorheological braking device according to claim 1, wherein an angle of each angular segment is less than 150°.

3. The magnetorheological braking device according to claim 1, wherein no magnetic field concentrator is disposed outside said angular segment.

4. A magnetorheological braking device comprising:
a stationary mount, a first brake component, and a second brake component;
one of said first or second brake components being rotationally fixed to said stationary mount, said first and second brake components being continuously rotatable relative to one another;
said first brake component extending in an axial direction, said first brake component having at least one electric coil and a magnetically conductive core extending in said axial direction;
said second brake component having a hollow casing extending about said first brake component;
said first brake component and said second brake component being disposed to form an encircling gap therebetween, said encircling gap being filled with a magnetorheological medium;
said core and/or said casing having magnetic field concentrators protruding into said encircling gap such that said encircling gap has a variable gap height; said at least one electric coil being wound about at least one portion of said core, and said at least one electric coil being configured to generate a magnetic field through said core, said magnetic field concentrators, and said encircling gap into a wall of said casing; and
at least one of said magnetic field concentrators having a cross-sectional area that tapers toward a distal end.

5. The magnetorheological braking device according to claim 4, wherein said electric coil is wound about said core in said axial direction and said electric coil is disposed on said core outside of said angular segment.

6. The magnetorheological braking device according to claim 1, wherein at least one of said magnetic field concentrators is radiused at a distal end.

7. The magnetorheological braking device according to claim 1, wherein said core and/or said casing has a plurality of arms as magnetic field concentrators, and wherein said arms project radially.

8. The magnetorheological braking device according to claim 7, wherein at least one of said arms is surrounded by a further electric coil.

9. The magnetorheological braking device according to claim 7, wherein each of said plurality of arms are surrounded by further electric coils.

10. The magnetorheological braking device according to claim 7, wherein a radial length of said arms is less than a length of said arms in said axial direction.

11. The magnetorheological braking device according to claim 1, wherein said at least one electric coil is wound about an axis of the braking device and generates a magnetic field in said axial direction.

12. The magnetorheological braking device according to claim 1, wherein said at least one electric coil is wound about said core in said axial direction and generates a magnetic field in a radial direction.

13. The magnetorheological braking device according to claim 1, wherein said magnetic field concentrators form a star-shaped external contour.

14. The magnetorheological braking device according to claim 1, wherein said casing has a cylindrical internal surface across at least one axial portion.

15. The magnetorheological braking device according to claim 1, wherein a maximum diameter of said electric coil in a radial direction within a coil plane is larger than a minimum diameter of said core in said radial direction transverse to said coil plane.

16. The magnetorheological braking device according to claim 7, wherein said at least one electric coil extends axially about at least one of said arms, and wherein a radial gap height between an outer end of said at least one of said arms and an internal surface of said casing is smaller than a radial gap dimension between an external surface of said first brake component beside said arm and said internal surface of said casing.

17. A magnetorheological braking device comprising:
a stationary mount, a first brake component, and a second brake component;
one of said first or second brake components being rotationally fixed to said stationary mount, said first and second brake components being continuously rotatable relative to one another;
said first brake component extending in an axial direction, said first brake component having at least one electric coil and a magnetically conductive core extending in said axial direction;
said second brake component having a hollow casing extending about said first brake component;
said first brake component and said second brake component being disposed to form an encircling gap therebetween, said encircling gap being filled with a magnetorheological medium;
said core and/or said casing having magnetic field concentrators protruding into said encircling gap such that said encircling gap has a variable gap height; said at least one electric coil being wound about at least one portion of said core, and said at least one electric coil being configured to generate a magnetic field through said core, said magnetic field concentrators, and said encircling gap into a wall of said casing; and
said second brake component being configured to be axially displaceable on said first brake component and enable volumetric compensation in during temperature variations and/or leakage.

18. A magnetorheological braking device comprising:
a stationary mount, a first brake component, and a second brake component;
one of said first or second brake components being rotationally fixed to said stationary mount, said first and second brake components being continuously rotatable relative to one another;
said first brake component extending in an axial direction, said first brake component having at least one electric coil and a magnetically conductive core extending in said axial direction;
said second brake component having a hollow casing extending about said first brake component;
said first brake component and said second brake component being disposed to form an encircling gap therebetween, said encircling gap being filled with a magnetorheological medium;
said core and/or said casing having magnetic field concentrators protruding into said encircling gap such that said encircling gap has a variable gap height; said at least one electric coil being wound about at least one portion of said core, and said at least one electric coil being configured to generate a magnetic field through said core, said magnetic field concentrators, and said encircling gap into a wall of said casing; and said second brake component by way of two bearing points of dissimilar external diameters being rotatably received on said first brake component and being configured to cause a volumetric variation in a chamber between said first brake component and said second brake component by way of an axial displacement.

19. The magnetorheological braking device according to claim 17, further comprising a shielding device configured to at least partially shield a sensor device from a magnetic field of said electric coil.

20. The magnetorheological braking device according to claim 19, wherein said shielding device has a shielding member that surrounds a magnetic ring unit, at least in portions, and said shielding device has a separation unit disposed between said shielding member and said magnetic ring unit and/or a magnetic decoupling device disposed between said shielding member and said rotating part.

21. The magnetorheological braking device according to claim 20, wherein said separation unit and/or said decoupling device has a magnetic conductivity which is less than that of said shielding member by a multiple.

22. The magnetorheological braking device according to claim 21, wherein said shielding device has at least one axial annular disk and at least one annular sleeve.

23. The magnetorheological braking device according to claim 21, wherein said shielding device and said magnetic ring unit are mutually spaced apart.

24. The magnetorheological braking device according to claim 21, further comprising:
a closed chamber between said brake components, said closed chamber being substantially filled with said magnetorheological medium; and
said second brake component, at a first end of said closed chamber, is rotatably received on said first brake component.

25. The magnetorheological braking device according to claim 1, further comprising a rotary button or a rotating wheel disposed on said casing.

26. The magnetorheological braking device according to claim 1, wherein said casing has a sleeve made from a magnetically conducting material and forms an external ring for the magnetic field.

27. The magnetorheological braking device according to claim 1, wherein magnetic field strengths of more than 350 A/m are generated in said encircling gap.

28. A device component comprising a magnetorheological braking device according to claim 1.

29. The device component according to claim 28, further comprising:
a user interface;
an operating panel;
a display;
a touch-sensitive display with or without haptic feedback; and/or
at least one sensor.

* * * * *